United States Patent [19]
Bailey et al.

[11] Patent Number: 5,947,146
[45] Date of Patent: Sep. 7, 1999

[54] LOW VOLUME VACUUM TOILET ASSEMBLY

[75] Inventors: Ronald J. Bailey, Wooster; Fred Leroy Lint, Lakeville; James A. Sigler; Pamela Kay Snyder, both of Perrysville, all of Ohio

[73] Assignee: Sealand Technology, Inc., Big Prairie, Ohio

[21] Appl. No.: 08/380,796

[22] Filed: Jan. 30, 1995

Related U.S. Application Data

[62] Division of application No. 08/123,846, Sep. 9, 1993, Pat. No. 5,408,704.

[51] Int. Cl.$^6$ .................................. B65D 6/02; E03D 1/24
[52] U.S. Cl. ................................. 137/205; 4/321; 220/660
[58] Field of Search ......................... 137/205, 565; 4/321, 322, 323, 431, 432; 220/660

[56] References Cited

U.S. PATENT DOCUMENTS

| | | | |
|---|---|---|---|
| 15,192 | 6/1856 | Peale | 137/844 |
| 3,382,812 | 5/1968 | Smith . | |
| 3,501,778 | 3/1970 | Minniear et al. | 4/321 |
| 3,529,908 | 9/1970 | Smith . | |
| 3,597,517 | 8/1971 | Smith . | |
| 3,599,248 | 8/1971 | Fulton et al. . | |
| 3,611,447 | 10/1971 | Howard | 4/323 |
| 3,663,970 | 5/1972 | Drouhard, Jr. et al. . | |
| 3,732,579 | 5/1973 | Allendar et al. | 4/431 |
| 3,774,461 | 11/1973 | Smith . | |
| 3,780,757 | 12/1973 | Jordan | 4/321 |
| 3,801,991 | 4/1974 | Fulton et al. | 4/115 |
| 4,275,470 | 6/1981 | Badger et al. | 4/431 |
| 4,306,321 | 12/1981 | Norlin | 4/431 |
| 4,672,690 | 6/1987 | Sigler . | |
| 4,713,847 | 12/1987 | Oldfelt et al. | 4/431 |
| 4,819,279 | 4/1989 | Sigler et al. . | |
| 4,974,264 | 12/1990 | Brian | 4/431 |
| 5,010,602 | 4/1991 | Sargent et al. | 4/321 |
| 5,031,249 | 7/1991 | Sargent | 4/321 |
| 5,036,554 | 8/1991 | Blount | 4/431 |
| 5,056,166 | 10/1991 | Sargent et al. | 4/323 |
| 5,139,655 | 8/1992 | Sigler . | |
| 5,245,711 | 9/1993 | Oldfelt et al. | 4/431 |

FOREIGN PATENT DOCUMENTS

| | | | |
|---|---|---|---|
| 3717963 | 12/1988 | Germany | 4/665 |
| 3932893 | 4/1990 | Germany | 4/434 |
| 40 03 555 | 8/1991 | Germany . | |
| 41 12 888 | 10/1991 | Germany . | |
| 41 31 367 | 3/1993 | Germany . | |
| 4140828 | 6/1993 | Germany | 4/322 |
| 23843 | 2/1977 | Japan | 4/434 |
| WO 83/01267 | 4/1983 | WIPO . | |

*Primary Examiner*—John Rivell
*Attorney, Agent, or Firm*—Nixon & Vanderhye P.C.

[57] ABSTRACT

A vacuum tank assembly has a low volume configuration so that it can be used in boats and recreational vehicles where space is at a premium. A stack of components, with a waste tank at the bottom, then a vacuum tank with directly connected vacuum pump, and one or more fresh water tanks, is located remote from a vacuum toilet, with a discharge from the toilet (below a vacuum-tight ball valve) connected to the vacuum tank, which is in turn connected to the vacuum pump, in turn connected to the waste tank. A submersible centrifugal pump may be provided mounted to a cap of the water tank, with an anti-siphon device associated with it. The vacuum tank is of high density polypropylene having flat walls, with no continuous flat surface more than 80 square inches. Lipless duckbill check valves are provided on opposite sides of the vacuum pump, the valves of elastomeric material having a ratio of the wall thickness to thickness of the sealing edges of about 1:1. The waste tank may have a dip tube with a dog leg portion having a large cross-sectional are oval bottom opening to minimize the possibility of clogging.

19 Claims, 7 Drawing Sheets

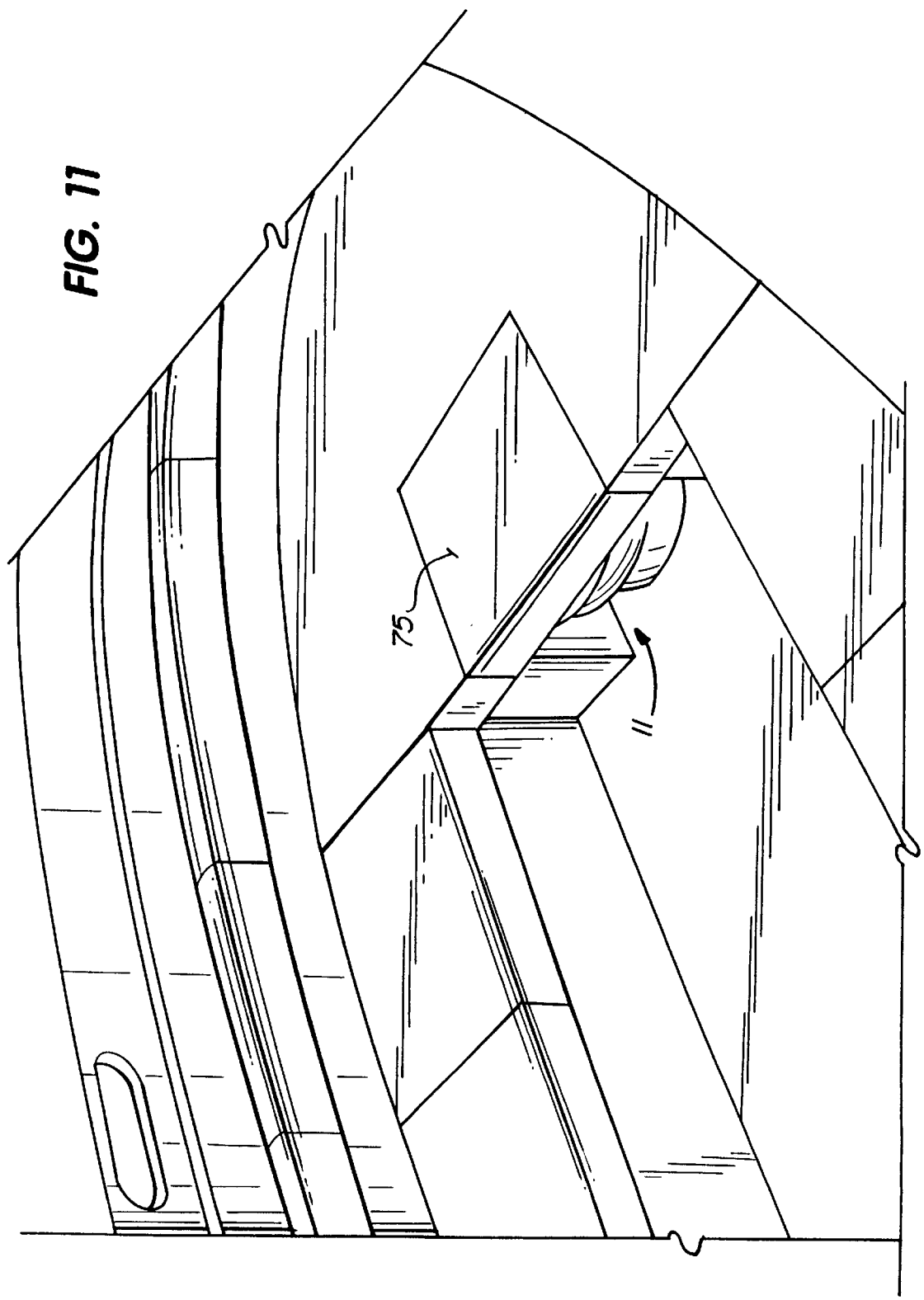

ID AND SUMMARY OF THE INVENTION

LOW VOLUME VACUUM TOILET ASSEMBLY

This is. a divisional of application Ser. No. 08/123,846, filed Sep. 9, 1993, now U.S. Pat. No. 5,408,704.

BACKGROUND AND SUMMARY OF THE INVENTION

Portable toilets are the most commonly used type of toilet in recreational vehicles and boats because of the minimum amount of space they require. However despite the better space utilization conventional portable toilet assemblies provide, they take up too much space for small vehicles and boats.

According to the present invention, a vacuum toilet assembly is provided which takes up a minimum of space so that it can fit in vehicles and boats where vacuum toilets were previously impractical, and an assembly which also provides minimum water usage. For example the toilet itself has a width of between 14 and 15 inches, a length of 18 to 20 is inches, and a height of 11 to 16 inches. The ball valve for connecting the vacuum tank to the toilet during flushing is less than 2.5 inches in diameter (e. g. 2 inches) rather than the conventional 3 inches. While the amount of water usage will depend upon how long the discharge valve associated with the toilet is operated, typically a 2.5–3 gallon sized water tank is sufficient to normally accommodate four adults for a period of 9–10 hours, who are expected to generate waste which will approximately fill a 5 gallon waste tank; a water pump may deliver water to the toilet at a rate of no more than 2 gallons per minute. Also, the vacuum tank, waste tank, and water tanks can be vertically stacked so that they take up no more space than is typically provided in a hanging locker or closet, and the vacuum pump and vacuum tank may be combined in a single module for optimum space saving.

The waste tank is also relatively small in size,. e. g. 5 gallons, and may have a dip tube and vent which allow—in combination with the particular connection of the vacuum pump thereto—the tank to be readily pumped out, and to allow discharge from the tank if the tank is full.

The plastic vacuum tank also is provided in a low volume configuration since it has flat sides, and is mounted directly to and nested with the vacuum pump, the flat sides having a wall thickness to deflection ratio which allows a non-cylindrical construction of the vacuum tank. The particular connection of the vacuum pump with respect to the vacuum tank and waste tank avoids conventional macerating pumps (which consume electricity at such a rate as to make them impractical for small boats or RV spaces), eliminates the need for a large waste tank by using vacuum to convey waste directly into the tank, and the chances of clogs at the outlet from the vacuum tank are minimized. Also, by the particular construction of duckbill check valves provided on opposite sides of the vacuum pump (having a particular wall thickness to sealing lip ratio) maximizes functionality of the pump.

According to one aspect of the present invention, a vacuum toilet assembly is provided which takes up a minimum of space yet has maximum operability, minimum water usage, and minimum chance of components clogging. The assembly comprises the following elements: A vacuum toilet having a waste discharge normally closed by a vacuum-tight valve. A manual actuator for the vacuum tight valve. A fresh water tank. A vacuum tank having an inlet and an outlet. A vacuum pump having an inlet and an outlet. A waste tank having an inlet. A first hose for connecting the waste discharge of the toilet, adjacent the vacuum-tight valve, to the vacuum tank inlet. Direct connection means for connecting the vacuum tank outlet directly to the vacuum pump inlet. A second hose for connecting the vacuum pump outlet to the waste tank inlet; and a conduit for connecting the fresh water tank to the vacuum toilet. The direct connection means preferably comprises a vacuum tight tubular connector in sealed relationship with an opening in the vacuum tank, which opening comprises the vacuum tank outlet; a tubular fitting integral with the vacuum pump removably connected to the vacuum tight tubular connector; and first and second check valves within or between the vacuum tight tubular connector and the integral tubular fitting.

At least one of the first and second check valves comprises a duckbill valve of maximum diameter of less than two inches, of elastomeric material (e. g. ethylene propylene) having side walls terminating in edges, with a generally "lipless" construction; and wherein the ratio of the thickness of the side walls to the edge is approximately 1:1. A third duckbill valve is also preferably provided between the vacuum pump outlet and the second hose also having this size and ratio.

The assembly also comprises a water pump for pumping water from the fresh water tank to the conduit, particularly a submersible centrifugal pump disposed within the fresh water tank. Typically the fresh water tank is located above the toilet, and has a cap releasably closing an opening therein; and the water pump is mounted to the cap and removable from the fresh water tank through the opening, and further comprising anti-siphon means associated with the water reservoir or conduit. The anti-siphon means comprises a small vent opening in the cap, and a small vent opening in the conduit between the pump and the cap within the fresh water tank. The water pump is preferably electrically operated, and the assembly further comprises an electrical switch controlled by operation of the handle for starting the water pump just before the handle moves the vacuum tight valve to an open position connecting the vacuum tank to the toilet discharge.

The vacuum pump is also preferably electrically operated, and a swivel connection between the second hose and the waste tank includes electrical contacts which disconnect the vacuum pump from a source of electrical energy when the swivel connection is moved to an electrical disconnect position with respect to the waste tank.

The waste tank, vacuum tank with vacuum pump, and fresh water tank are preferably stacked one above the other in order in a vertical stack, with the waste tank on the bottom and fresh water tank on top, the vacuum tank inlet and outlet and vacuum pump being at the bottom of the vacuum tank. A second fresh water tank may also be provided, stacked above the fresh water tank, with a liquid tight vertical passage between them.

The waste tank has a bottom and a top, and a dip tube provided within the waste tank extends from adjacent the bottom to the top. The dip tube comprises a circular cross-section tube having a straight portion adjacent the top thereof, and a dog leg portion between the straight portion and bottom thereof, and terminated adjacent the waste tank bottom on the dog leg by a surface substantially perpendicular to the straight portion, so that the bottom opening of the dip tube is larger in area than the cross-sectional area of the circular tube, and is substantially oval in shape.

The waste tank preferably has flat walls yet is cost-effectively made out of plastic material, particularly high density polypropylene about one-quarter inch thick. It is possible to make such a tank having no visible deflection at a vacuum of about 25 inches of mercury as long as there is no more than 80 square inches of continuous flat surface forming a wall (i. e. not interrupted by an angle or the like). Thus, the waste tank may be rotocast or blow molded, having a one piece construction, and avoiding the costs associated with injection molding.

It is the primary object of the present invention to provide a low volume configuration vacuum toilet assembly, with minimum water usage, and minimum chance of clogging. This and other objects of the invention will become clear from an inspection of the detailed description of the invention, and from the appended claims.

BRIEF DESCRIPTION OF THE DRAWINGS

FIG. 11 is a top perspective view showing one exemplary position for mounting of the toilet of FIG. 6 so that it is out of the way and substantially hidden, in the hull of a boat.

DETAILED DESCRIPTION OF THE DRAWINGS

Figure 1:
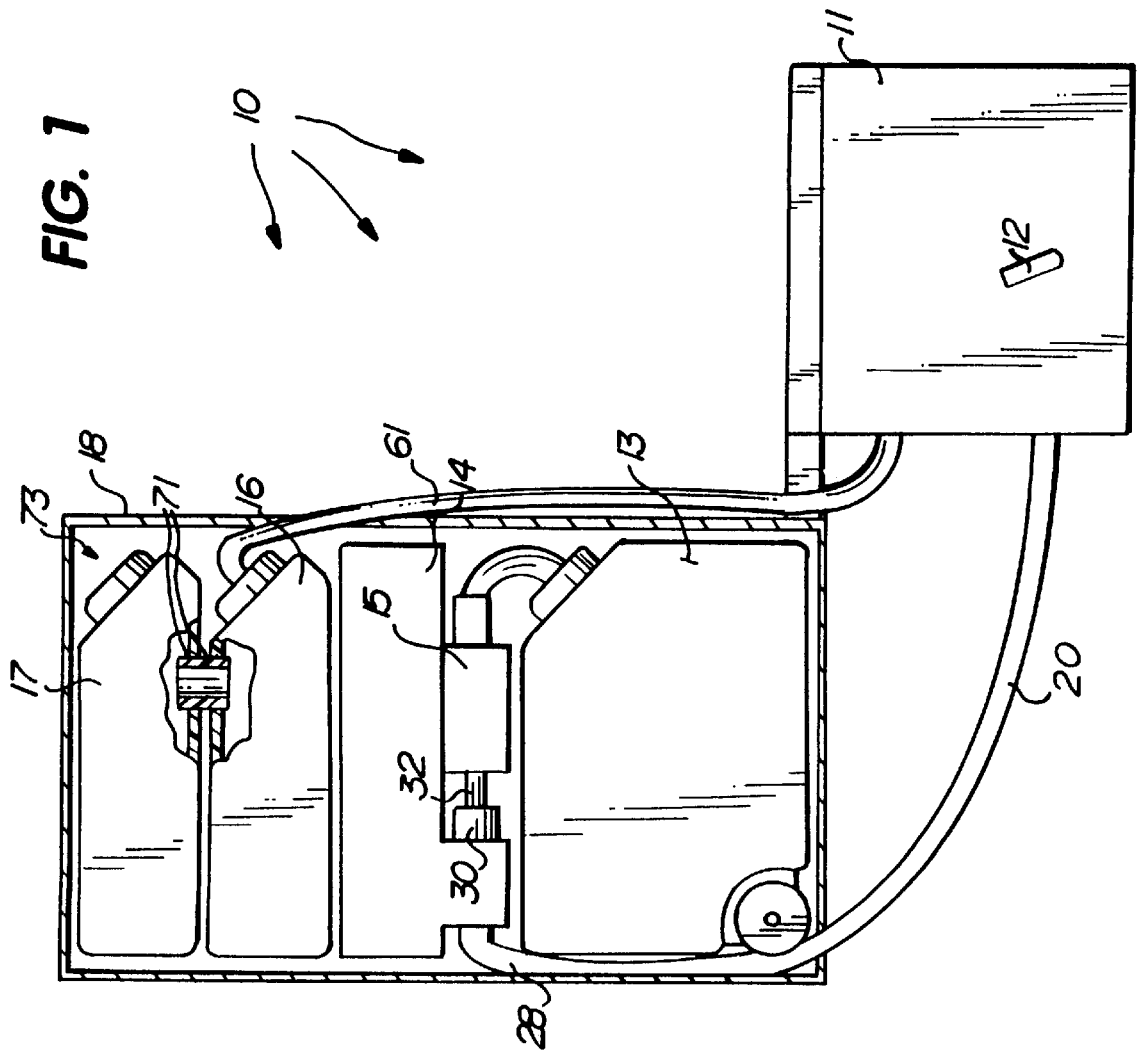
FIG. 1 is a schematic side view of an exemplary vacuum toilet assembly according to the present invention, shown mounted in a low volume configuration in a boat recreational vehicle.

A vacuum assembly according to the present invention is shown generally by reference numeral 10 in FIG. 1, comprising as the main components a vacuum toilet 11 with a manual valve actuator including a handle 12 for "flushing" the toilet 11, a waste tank 13, a vacuum tank 14, a vacuum pump 15, and at least a first water tank 16 (and preferably a second water tank 17). The components illustrated in FIG. 1 have a low volume configuration, the elements 13–17 being provided in a vertical stack, and taking up such a small amount of space that they fit within the hanging locker or closet 18 of the type often provided in small size recreational vehicles or boats.

Figure 6:
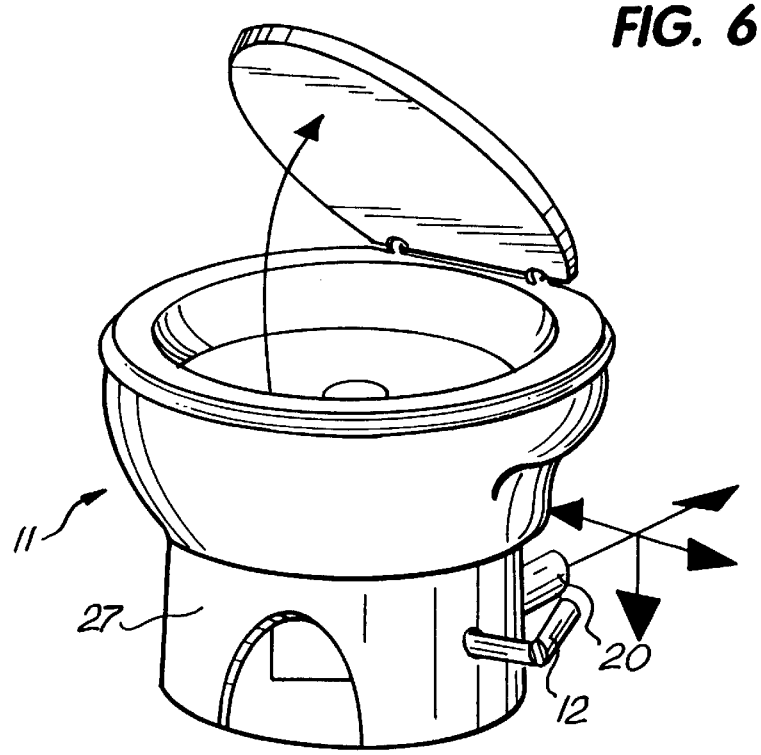
FIG. 6 is a top perspective view of the low volume toilet of FIG. 1.

The toilet 11 itself is dimensioned so that it fits into a space normally provided for a small portable toilet, such as a SANIPOTTIE sold by SeaLand Technology, Inc. of Bic Prairie, Ohio. The optimum space is one 14.5 inches wide, 19 inches in length (front to back), and a height of 12 inches. The range of dimensions are preferably 14–15 inches, 18–20 inches, and 11–16 inches, respectively. The toilet 11 is basically of the type such as shown in U.S. Pat. No. 4,819,279, the disclosure of which is incorporated by reference herein, including having the area where the valve hemisphere initially "cracks open" located directly above the orifice, as seen in FIG. 6 of that patent. The invention also has a discharge 19 (see FIG. 7) that is selectively connected to, or isolated from, the vacuum line 20 by a vacuum-tight valve, such as the ball valve 21 (which may be spherical, as shown in the drawings, or hemispherical as shown in said U.S. Pat. No. 4,819,279). The ball valve 21 is conventional except that it has a diameter of less than 2.5 inches (e. g. 2 inches), rather than the conventional size of 3 inches. The actuator 12 (see FIG. 7) preferably is biased by a spring, e. g. torsion spring 22, to move: it to a position in which the ball 21 is closed.

The actuator shaft 23, connected to the handle 12 and the ball 21, also has a cam 24 connected to it which operates conventional microswitch 25. The cam 24 and switch 25 are positioned with respect to each other so that the switch 25 is actuated before the valve 21 opens, the switch 25 controlling operation of a water pump 26, as will be hereinafter described. As seen in FIG. 6, the toilet 11 may be mounted on a base 27 which is distinct from the ceramic toilet 11, the vacuum line 20 coming from the rear of the toilet 11/base 27 in the embodiment illustrated in FIG. 6, but the line 20 may come out from the left, right, or bottom of the base 27 instead.

Figure 2:
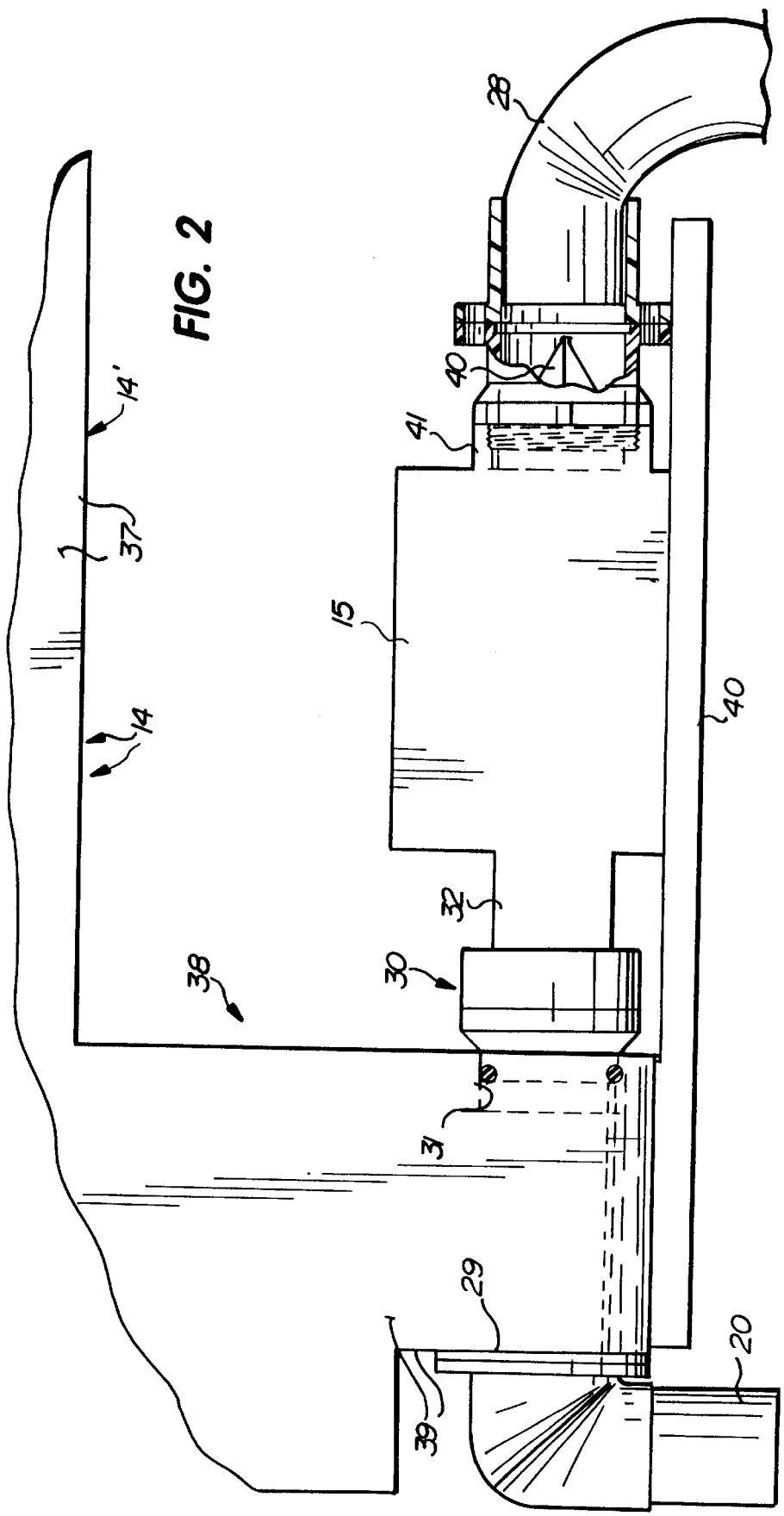
FIG. 2 is a detail side view, partly in cross section and partly in elevation, showing the connection of the vacuum pump of the assembly of FIG. 1 to the vacuum tank and hose leading to the waste tank in accordance with the invention.
Figure 3:
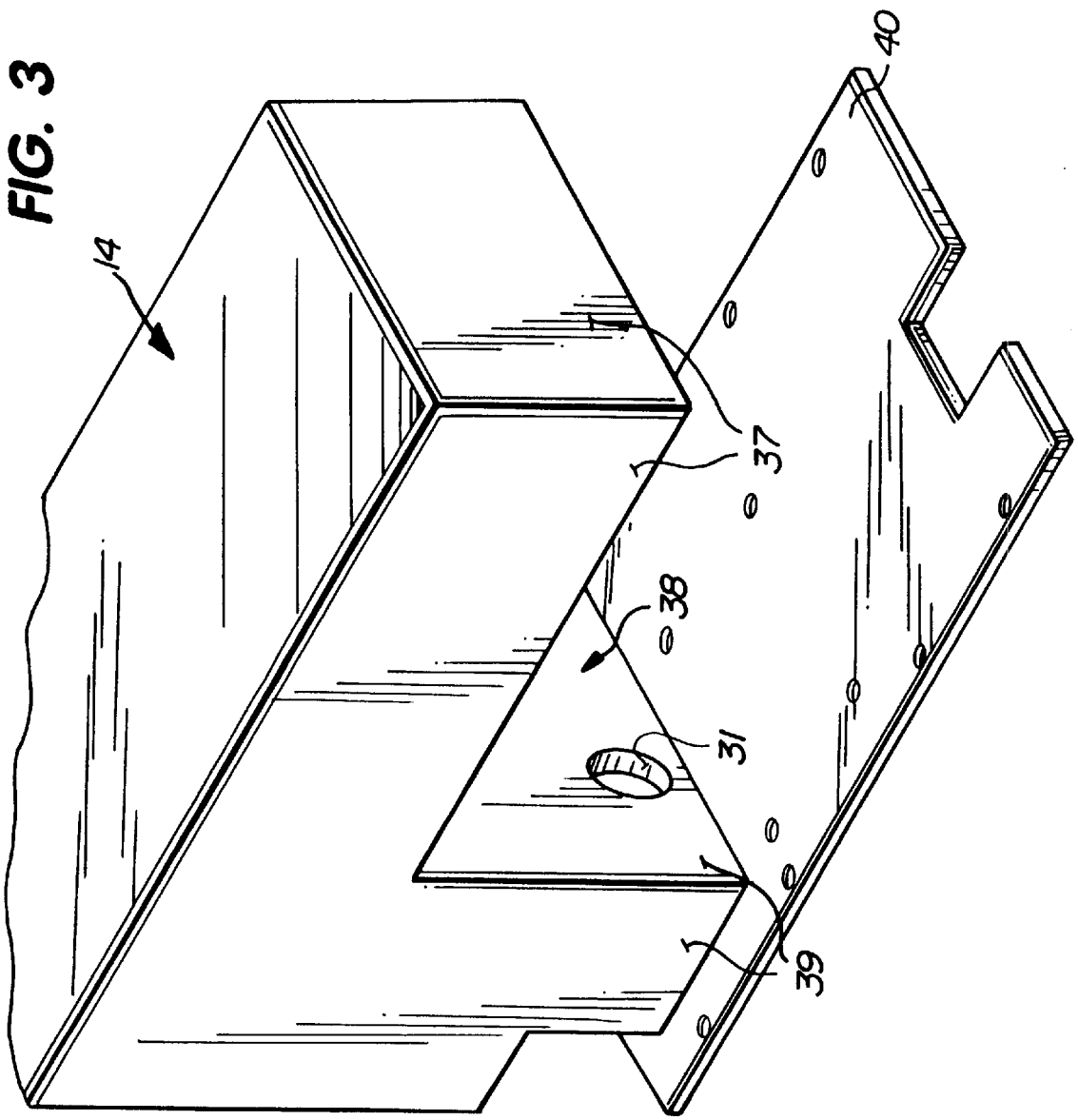
FIG. 3 is a schematic perspective view of the vacuum tank of FIGS. 1 and 2.
Figure 4:
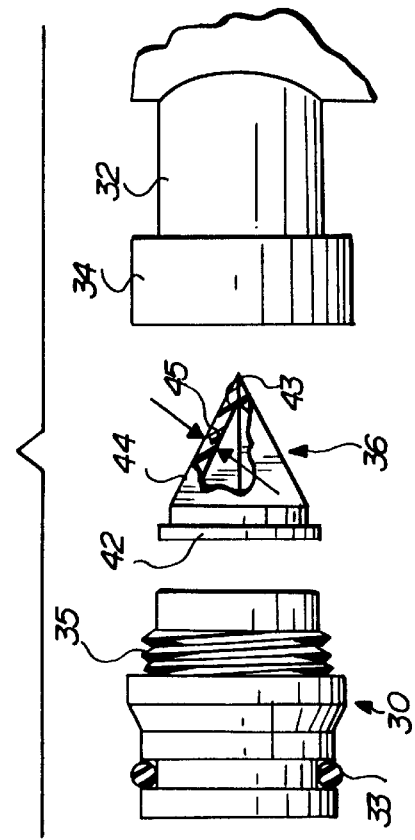
FIG. 4 is a side detail exploded view, partly in cross section and partly in elevation, of the inlet connector between the vacuum tank and vacuum pump of the apparatus of FIG. 2.
Figure 5:
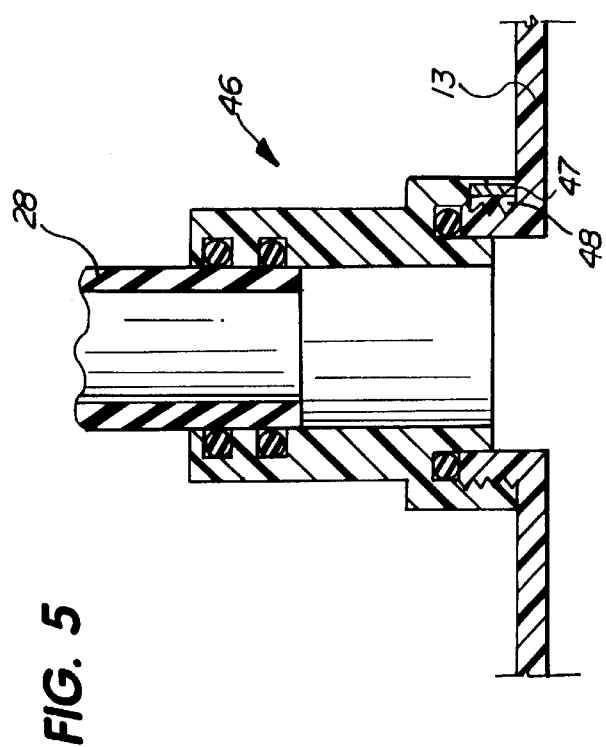
FIG. 5 is a side detail cross-sectional view of the connection between the hose from the vacuum pump and the waste tank of the apparatus of FIG. 2.

The vacuum pump 15 and vacuum tank 14 are illustrated in more detail in FIGS. 2 and 3, with the connection between the pump 15 and tank 14 shown exploded in FIG. 4, and the connection between the flexible hose 28 between the pump 15 and the waste tank 13 at the tank 13 illustrated in FIG. 5. The pump 15 is preferably a self-priming positive displacement bellows pump, such as shown in U.S. Pat. Nos. 3,774,461, 3,597,517, 3,529,908 and 3,382,812, which is activated by a conventional pressure differential switch (not shown in FIG. 2, but shown schematically at 51 in FIG. 7)) just inside the tank 14, as is conventional in SeaLand vacuum toilets. The pressure differential switch is located right with the vacuum pump and tank, in an integral module, the pump 15 and tank 13 being visible as an integral module in FIGS. 1 and 2.

The vacuum line 20 from the toilet 11 to the tank 14 is connected to the inlet to the tank 14, while the tubular connector 30 fits within the outlet 31 from the tank 14, the connector 30 in turn connected to the integral fitting 32 of the pump 15. As seen in FIG. 4, the connector 30 may have an O-ring 33 which makes a sealing fit with the opening 31, and an internally threaded termination 34 may be provided on the fitting 32 to releasably connect to connector 30, engaging the external threads 35 thereof. As is conventional, two check valves—preferably duckbill valves (only one of which is shown in FIG. 4, at 36)—are provided at the inlet to the pump 15.

Because of the position of the pump 15 as illustrated in FIG. 2, a number of advantages are provided. For one, since the waste is delivered to the tank 14 in a mist-like form because of the high velocity provided by the vacuum, and since the pump 15 is immediately adjacent the bottom of the tank 14, the waste will be immediately be removed from the tank 14 before it has a chance to significantly re-form into larger masses, and therefore the chances of clogging the outlet 31 are minimized. Also, the location of the pump 15 nested within the volume defined by the tank 14 minimizes space. Any waste entering the tank will eventually gravity drain into the pump 15. The pump 15 will positively displace waste into the tank 13. No macerating pump (with its commensurate high energy draw) is necessary.

The vacuum tank 14 according to the present invention is also particularly configured for low volume configuration. Although the vacuum the tank 14 will "hold" is relatively large, it is made with flat walls 37, and a bottom extension 38 also having flat walls 39, and is made of plastic. For example, tank 14 can be made by rotational casting or blow molding so that it is made as one piece, and therefore the tooling costs and assembly costs of injection molding are avoided. For example, the tank 14 preferably is made of high density polypropylene plastic about one quarter inch thick.

Manufacture of the tank 14 with flat walls is possible because according to the invention it has been recognized that if the amount of any continuous (uninterrupted) flat surface is kept at 80 square inches or less in area there will be no visible deflection of a one quarter inch wall thickness high density polypropylene tank. The tank 14 illustrated in FIGS. 2 and 3 has no single flat surface of more than 80 square inches in area. The tank 14 typically has a nominal 2.5 gallon volume, which is sufficient to provide enough vacuum for flushing, but minimizes (especially with the flat wall, generally parallelepiped construction thereof) the volume it takes up. By mounting the pump 15 and pressure differential switch (51) with the tank 14 in an integral module (see FIGS. 1–3), space savings are optimized.

At the outlet 41 of the pump 15, another duckbill valve 40 is provided to prevent backup of waste from hose 28 into the pump 15. Instead of two duckbill valves in the outlet 41, as is conventional, only one valve, 40, is provided according to the invention. The valves 36, 40 used in the practice of the invention are not conventional duckbill valves, however, but rather are improved compared to the prior art.

As shown for the duckbill valve 36 illustrated in FIG. 4, and is conventional, the duckbill valves 36, 40 according to the invention are of elastomeric material (e. g. ethylene propylene with a Type A durometer of about 40–70, e. g. 65), have a tubular inlet 42 at one end thereof of diameter of less than about 2 inches, and tapered side walls 44 between the tubular inlet 42 and edge terminations 43 of the side walls 44. The side walls 44 have a particular wall thickness 45, and the edges 43, where sealing takes place, also have a particular thickness. Distinct from the prior art, it has been recognized according to the invention that the ratio of the wall thickness 45 to the thickness of the sealing edges 43 is critical for optimum functionality; that is the ratio should be roughly about 1:1. For example, if the thickness at the edges 43 is 0.092 inches, the valve 36 (with the inlet 42 having a diameter of about 1.6 inches) functions well with a wall thickness 45 of 0.095 inches.

Vote that the valve 36 has generally a "lipless" construction. Conventional duckbill valves used to valve pure liquids typically have wide lips at the ends of the side walls, but for valving liquids with a large amount of solids—like sewage—the lips should have a small or zero width. Duckbill valves having lips with a small or zero width (small lips being shown in FIGS. 2 and 4) are "lipless" as that term is conventionally used, and used herein. The valves 36, 40 according to the invention are thus lipless.

FIG. 5 shows a swivel connector 46 that is provided according to the present invention to connect the flexible pipe 28 which leads from the pump 15 to the waste tank 13. The swivel connector 46 is provided with electrical contacts 47 which cooperate with electrical contacts 48 that are stationary with respect to the tank 13 so that when the connector 46 is rotated to a particular position with respect to tank 13, which position allows it to be disconnected from tank 13, the contacts 47, 48 are not in engagement (as they usually are), breaking a circuit flowing between them and thereby cutting the pump 15 off from the battery 50 (see FIG. 7), or other source of emf, so that the electrical pump can not operate. The pump 15 is normally controlled by operation of the conventional pressure differential switch 51.

Figure 8:
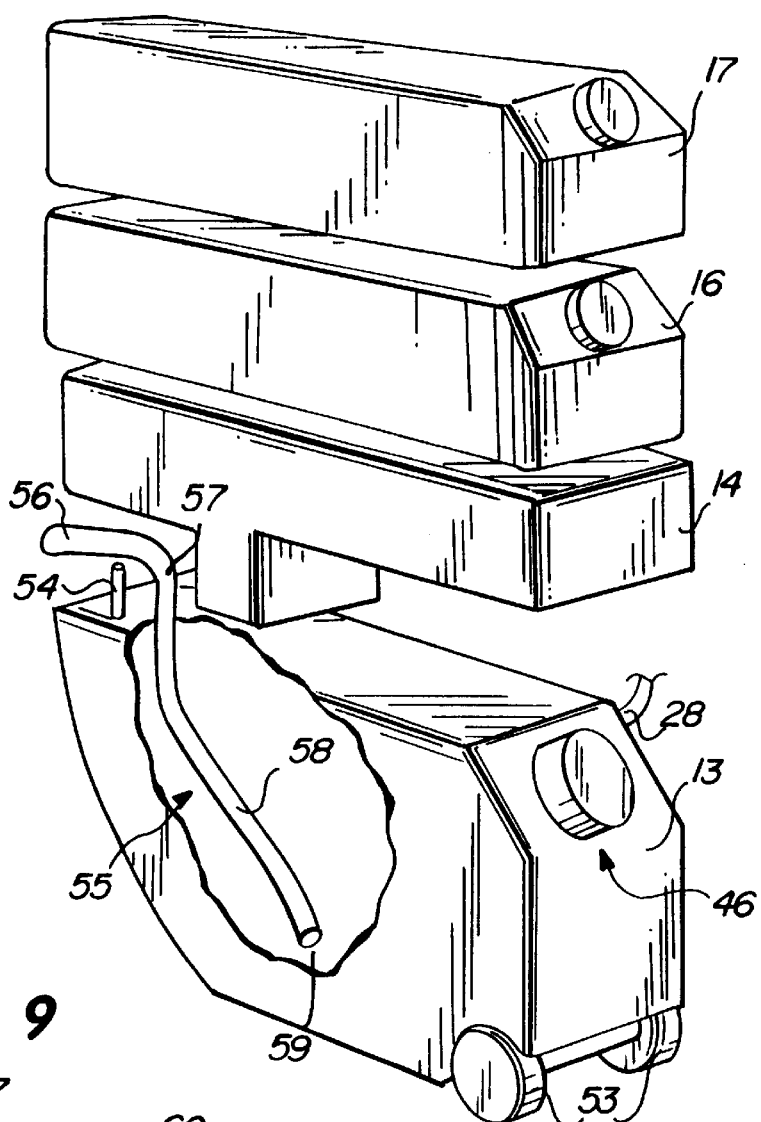
FIG. 8 is a perspective schematic view of the various tanks of the assembly of FIG. 1, and showing an exemplary dip tube and vent associated with the waste tank.

FIG. 8 shows in perspective stacking of the various tanks in the assembly 10 according to the invention, and also shows details of the tank 13, which typically has a holding volume of about 5 gallons, and may be mounted on wheels 53 for ease of transport. It also has a conventional vent valve 54, and optionally has a suction dip tube shown generally at 55, which can be connected to a pump out station, or in emergency situations when the tank 13 is in a boat and full can be used to discharge the waste directly overboard.

Figure 9:
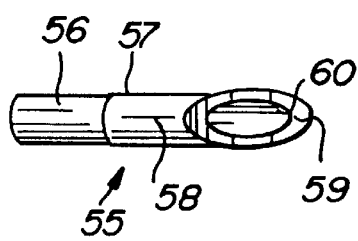
FIG. 9 is bottom plan view of the dip tube from FIG. 8, showing the oval-shaped, large opening in the bottom.

The dip tube 55 has an unusual, advantageous construction. It is substantially circular in cross-section, with an outlet portion 56 at one end thereof, a substantially vertical straight portion 57, and a dog leg portion 58. The dog leg portion terminates at end 59, just above the bottom 60 of the tank 13. In conventional holding tanks with suction dip tubes, the tube is of the same circular cross-section and cross-sectional area at the bottom thereof as during the rest of its length. It has been found according to the invention that this results in too fast a flow up the dip tube when pumping out the tank 13, and can cause toilet tissue, or other material, to clog the bottom of the tube, thereby preventing pump-out. The dip tube 55 according to the invention is configured at the bottom 59 thereof in such a way, however, to minimize the possibility of clogging. The end 59 is provided in a plane substantially perpendicular to straight portion 57 of the tube 55 so that the end 59 has an opening 60 (see FIG. 9) that is generally oval-shaped, and has a larger cross-sectional area than the rest of the tube 55, as readily seen in FIG. 9. This particular shape of the opening 60 at the end 59 causes the tissue and other solid material to move more slowly into the tube 55, in a manner less likely to cause solid material to clog the opening (60) at the bottom of the tube 55.

To pump directly overboard when the tank 13 is full, one merely closes the vent 54, and positions the end 56 of tube 55 so that it is overboard. The conduit 61 from water tank 16 is clamped off, or the water is otherwise turned off, and the handle 12 operated to flush the toilet 11. The positive pressure built up by the pump 15 forces air into the tank 13, and since the air has nowhere to go with the vent 54 closed, pressurizes the volume above the waste in tank 13, and thus pumps the liquid/solid mix in tank 13 out tube 55 end 56.

Figure 10:
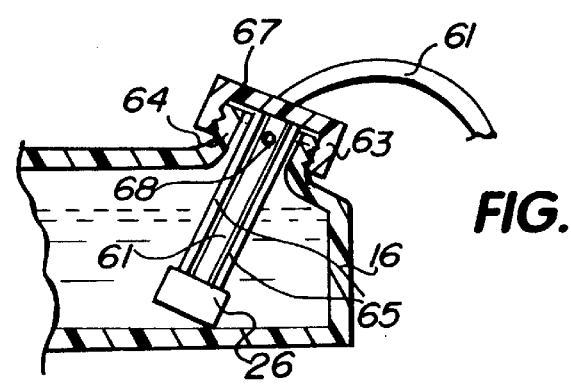
FIG. 10 is a detail side view, partly in cross-section and partly in elevation, of the main water reservoir of the assembly of FIG. 1, and showing the centrifugal water pump mounted therein.

FIG. 10 illustrates the preferred manner of mounting a water pump 26 according to the invention to supply water to the toilet 11, through conduit 61, when the tank 16 is remote from the toilet 11. The pump 26 is preferably a small submersible D. C. pump having a height of about 3 inches, and only about 1.5 inches in diameter. It is a centrifugal, impeller, pump having a capacity of pumping only about 2 gallons per minute, such as available from Comet-Pumpen of Kriftel, Germany, and sold under the trademark THE ELEGANT. The pump 26 is mounted directly to the cap 63 closing off the spout 64 of the tank 16, as by rods 65, and the pump 26 is centered with respect to the spout 64 and of small enough size so that it can be withdrawn from the tank 16 merely by unscrewing the cap 63 and pulling out away from the tank 16.

Figure 7:
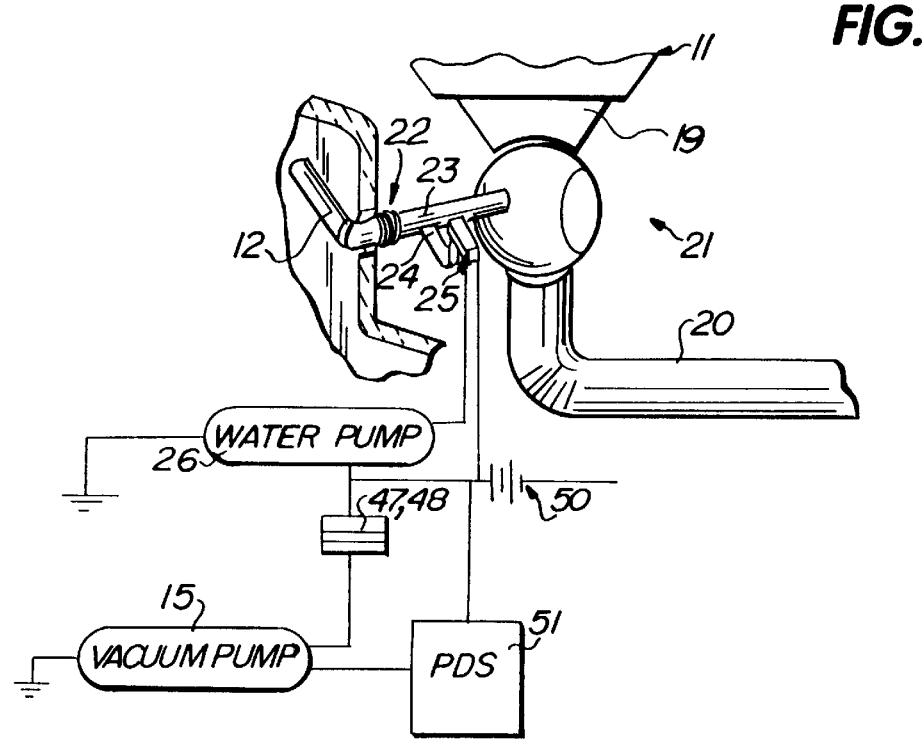
FIG. 7 is a schematic and diagrammatic perspective view showing the control interrelationship between the actuator for toilet flushing, water pump, emf source, and vacuum pump according to one exemplary embodiment of the invention.

It is desirable to provide an anti-siphon means to prevent water from running out of the tank 16 into the toilet 11 through conduit 61 after the pump 26 has stopped operation (as a result of the handle 12 and rod 2 3 being moved under the influence of spring 22 back to its initial position, so that the switch 25 opens, cutting flow of current from battery 50—see FIG. 7) when the tank 16 is above the toilet 11. The anti-siphon means may be very simple, comprising a small (e. g. 1/16inch in diameter) hole 67 in cap 63, and another small hole 68 in conduit 61 within the tank 16.

Where two fresh water tanks 16, 17 are utilized, as seen in FIG. 1, it is not desirable to have to switch from one tank to the other manually after one has been exhausted; however it may still be desirable to have two different tanks 16, 17 rather than a single large one, to provide a modular arrangement. This is accomplished according to the invention by providing an opening 70 in the top of tank 16 which is adapted to receive in liquid-tight relationship the tube 71 which extends from the bottom of the top tank 17. The tube 71 may have external screw threads 72 at the top thereof adapted to receive an inner cap (not shown), which may be accessed through the larger capped opening 73. Thus, one can reach through the open capped opening 73 and remove the cap from the tube 71, and then remove the tank 17 from the tank 16, fill it up, and then bring it back and insert tube 71 back into opening 70. Then the inner cap over tube 71 is unscrewed, and the water from tank 16 will then flow through tube 71 into tank 16 as water flows out of tank 16 through conduit 6.

It will thus be seen that according to the invention, a low volume configuration vacuum toilet assembly is provided which uses a minimum of water, may be easily stowed, and has minimum chance of clogging or malfunction. As an example of how little space is necessary, and how the assembly 10 can be used even on a small boat, attention is directed to FIG. 11 where the toilet 11 is shown mounted beneath a conventional seat cushion 75 in the hull of a small boat.

Other conventional components or assemblies may be used with what is described above. For example, the tank 13 may have a conventional 3/4full indicator, the water tanks may have empty indicators, etc.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An integral module for a low volume human waste handling system comprising a vacuum tank and a vacuum pump, the vacuum pump having an inlet directly connected to an outlet from said vacuum tank; said vacuum tank of rotational molded or blow molded plastic having flat walls, said flat walls having no continuous flat surface of greater than about 80 square inches in area.

2. A module as recited in claim 1 wherein said plastic of said vacuum tank is polypropylene.

3. A module as recited in claim 2 wherein said vacuum tank flat walls have a thickness of about one quarter inch.

4. A module as recited in claim 1 wherein said vacuum tank flat walls have a thickness of about one quarter inch.

5. A module as recited in claim 1 wherein said vacuum tank includes a substantially parallelepiped main portion, with a generally vertically extending extension from said main portion; and wherein said outlet from said vacuum tank is in said extension.

6. A module as recited in claim 2 wherein said vacuum tank includes a substantially parallelepiped main portion, with a generally vertically extending extension from said main portion; and wherein said outlet from said vacuum tank is in said extension.

7. A module as recited in claim 4 wherein said vacuum tank includes a substantially parallelepiped main portion, with a generally vertically extending extension from said main portion; and wherein said outlet from said vacuum tank is in said extension.

8. A module as recited in claim 1 comprising at least one duckbill valve connected between said vacuum tank outlet and said pump inlet, said duckbill valve having an integral body of elastomeric material having a tubular inlet portion at a first end with a diameter of less than 2 inches, and side walls tapering down to sealing edges at a second end opposite the first end, the side walls and sealing edges having predetermined thicknesses; and wherein the ratio of wall thickness to sealing edge thickness is about 1:1.

9. A module as recited in claim 8 wherein said duckbill valve integral body is made of ethylene propylene.

10. A module as recited in claim 1 wherein said vacuum tank has a volume of about 2.5 gallons.

11. A rotational molded or blow molded vacuum tank of plastic having flat walls, said flat walls having no continuous flat surface of greater than about 80 square inches in area.

12. A vacuum tank as recited in claim 11 wherein said flat walls are of polypropylene having a thickness of about one quarter inch.

13. A vacuum tank as recited in claim 11 further comprising an inlet and an outlet.

14. An integral module for a low volume human waste handling system comprising a vacuum tank and a vacuum pump, the vacuum pump having an inlet directly connected to an outlet from said vacuum tank, said vacuum tank of rotational molded or blow molded plastic having flat walls, said flat walls being configured such that there is no visible deflection when a vacuum is applied thereto, said vacuum tank including a substantially parallelepiped main portion with a generally vertically extending extension from said main portion, wherein said outlet from said vacuum tank is in said extension.

15. A module as recited in claim 14 wherein said plastic of said vacuum tank is polypropylene.

16. A module as recited in claim 15 wherein said vacuum tank flat walls have a thickness of about one quarter inch.

17. A module as recited in claim 14 wherein said vacuum tank flat walls have a thickness of about one quarter inch.

18. A module as recited in claim 16 wherein said flat walls have no continuous flat surface of greater than about 80 square inches in area.

19. A module as recited in claim 14 wherein said flat walls have no continuous flat surface of greater than about 80 square inches in area.

* * * * *